(12) United States Patent
Milojevic et al.

(10) Patent No.: US 12,521,895 B2
(45) Date of Patent: Jan. 13, 2026

(54) ADAPTIVE GRIPPER FINGER, GRIPPER DEVICE AND METHOD OF USING ADAPTIVE GRIPPER DEVICE

(71) Applicant: THE HUMAN TOUCH ROBOTICS OY, Lappeenranta (FI)

(72) Inventors: Andrija Milojevic, Lappeenranta (FI); Sebastian Linss, Ilmenau (DE); Heikki Handroos, Lappeenranta (FI)

(73) Assignee: THE HUMAN TOUCH ROBOTICS OY, Lappeenranta (FI)

( * ) Notice: Subject to any disclaimer, the term of this patent is extended or adjusted under 35 U.S.C. 154(b) by 988 days.

(21) Appl. No.: 17/639,718

(22) PCT Filed: Aug. 31, 2020

(86) PCT No.: PCT/FI2020/050564
§ 371 (c)(1),
(2) Date: Mar. 2, 2022

(87) PCT Pub. No.: WO2021/044079
PCT Pub. Date: Mar. 11, 2021

(65) Prior Publication Data
US 2022/0395988 A1 Dec. 15, 2022

(30) Foreign Application Priority Data
Sep. 2, 2019 (FI) ...................................... 20195724

(51) Int. Cl.
*B25J 15/08* (2006.01)
(52) U.S. Cl.
CPC ..................... *B25J 15/08* (2013.01)
(58) Field of Classification Search
CPC ........ B25J 15/08; B25J 15/0009; B25J 15/10; A61F 2/583

(Continued)

(56) References Cited

U.S. PATENT DOCUMENTS

| 6,759,790 | B1 | 7/2004 | Bugel et al. |
| 8,333,417 | B2 | 12/2012 | Bannasch et al. |

(Continued)

FOREIGN PATENT DOCUMENTS

| CN | 104858885 A | 8/2015 |
| CN | 106346510 A | 1/2017 |

(Continued)

OTHER PUBLICATIONS

Milojevic et al "Adaptive Soft Robotic Gripper Based on Shape Morphing Compliant System" 2018 International Conference on Reconfigurable Mechanisms and Robots, IEEE (Jun. 20, 2018).

(Continued)

*Primary Examiner* — Paul T Chin
(74) *Attorney, Agent, or Firm* — Harness, Dickey & Pierce, P.L.C.

(57) ABSTRACT

A gripper finger (1) for a gripper device having a monolithic elastic structure comprising an inside arm (2) having a first folding point (8) forming an angle C; an outside arm (3) having a second folding point (9), wherein the inside arm or the outside arm comprises a gripping surface for gripping an object; a base portion (4) having a first base end (10), from which the inside arm (2) is extending, and a second base end (11), from which the outside arm (3) is extending; a tip portion (6) where the end of the outside arm (3) and the end of the inside arm (2) are connected to each other; a support arm (5) extending from the first base end (10) to the second folding point (9); the gripper finger further comprises an angle E between a first part of the outside arm (3), arranged between the second base end (11) and the second folding point (9), and the support arm (5), wherein the angle E is at least 11.5 degrees.

15 Claims, 10 Drawing Sheets

(58) Field of Classification Search
USPC .................................................. 294/106, 86.4
See application file for complete search history.

(56) References Cited

U.S. PATENT DOCUMENTS

| | | | |
|---|---|---|---|
| 8,474,893 | B2 | 7/2013 | Kawanami et al. |
| 10,618,182 | B2* | 4/2020 | Zheng .................... B25J 15/022 |
| 2005/0264019 | A1 | 12/2005 | Muramatsu et al. |
| 2010/0181792 | A1* | 7/2010 | Birglen ................ B25J 15/0009 901/39 |
| 2013/0154292 | A1 | 6/2013 | Savran et al. |
| 2014/0365009 | A1 | 12/2014 | Wettels |
| 2015/0032152 | A1 | 1/2015 | Frings |
| 2017/0182657 | A1 | 6/2017 | Rose et al. |
| 2017/0252930 | A1 | 9/2017 | Birglen |
| 2018/0117773 | A1 | 5/2018 | Odhner et al. |
| 2022/0152847 | A1* | 5/2022 | Isobe .................... B25J 15/0033 |
| 2023/0075011 | A1* | 3/2023 | Kim .................... B25J 15/0253 |
| 2025/0018585 | A1* | 1/2025 | Seo .......................... B25J 9/106 |

FOREIGN PATENT DOCUMENTS

| | | |
|---|---|---|
| CN | 108284430 A | 7/2018 |
| DE | 19523229 A1 | 1/1997 |
| JP | H05293778 A | 11/1993 |
| WO | WO-2016141266 A1 | 9/2016 |

OTHER PUBLICATIONS

L. Chih-Hsing et al "A Topology-Optimized 3D Printed Compliant Finger with Flex Sensor for Adaptive Grasping of Unknown Objects" 2019 IEEE/ASME International Conference on Advanced Intelligent Mechatronics (AIM, IEEE (Jul. 8, 2019).

Fabio "Compliant Robot Gripper Won't Scramble Your Eggs" https://hackaday.com/2013/12/03/compliant-robot-gripper-wont-scramble-your-eggs/ (2013).

B. Deshmukh et al "Study of Various Compliant Micromechanism And Introduction Of A Compliant Micromotion replicating Methanism" https://iaeme.com/MasterAdmin/Journal_uploads/IJMET/VOLUME_3_ISSUE_3/IJMET_03_03_051.pdf https://protect-us.mimecast.com/s/GurlCDkY16CoP3L8S5qDDg (2012).

L. Bykerk et al "A topology Optimisation Based Design Of A Compliant Gripper for Grasping Objects with Irregular Shapes" https://www.semanticscholar.org/paper/A-topology-optimisation-based-design-of-a-compliant-Bykerk-Liu/8eb13f9c0f30ccd9e2e777eefb6ca98e0df4b7c2 https://protect-us.mimecast.com/s/9m22CERZ61HIPp8ZipEZPI (2016).

J. Y. Wang et al "A Constant-Force Compliant Gripper for Handling Objects of Various Sizes" https://www.researchgate.net/publication/270773126_A_Constant-Force_Compliant_Gripper_for_Handling_Objects_of_Various_Sizes https://protect-us.mimecast.com/s/hbEZCG6YvzCBgANzCOE3KC (2014).

L. Wang et al "Mechanics and Energetics in Tool Manufacture and Use: A Synthetic Approach" https://royalsocietypublishing.org/doi/10.1098/rsif.2014.0827 https://protect-us.mimecast.com/s/JRLxCJ6YyzCBXKWjCvgbYn (2014).

Search report from corresponding Finnish App No. 20195724 mailed Mar. 31, 2020.

International Search Report and Written Opinion of the International Search Authority, issued in PCT/FI2020/050564, mailed Nov. 30, 2020; ISA/EP.

* cited by examiner

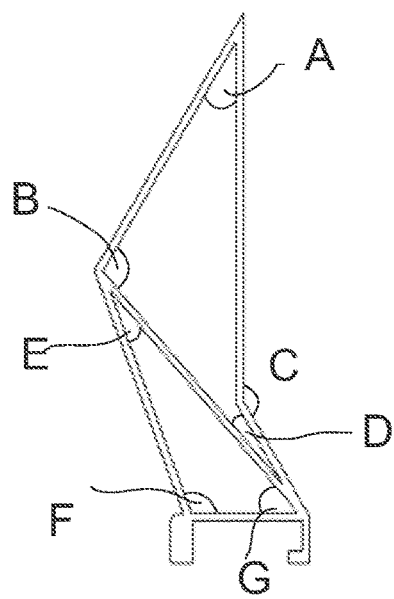
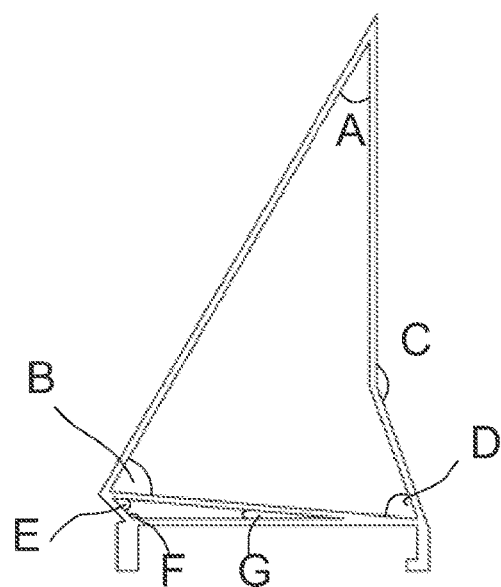
FIG. 7  FIG. 8
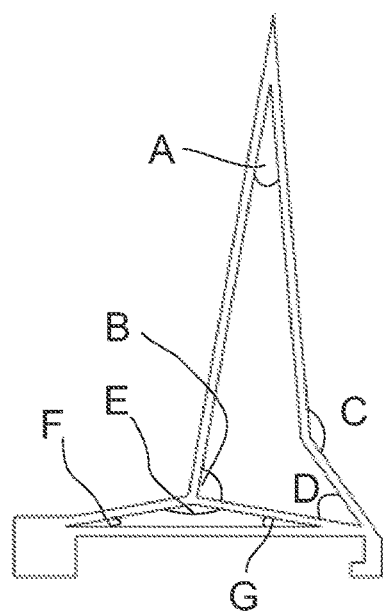
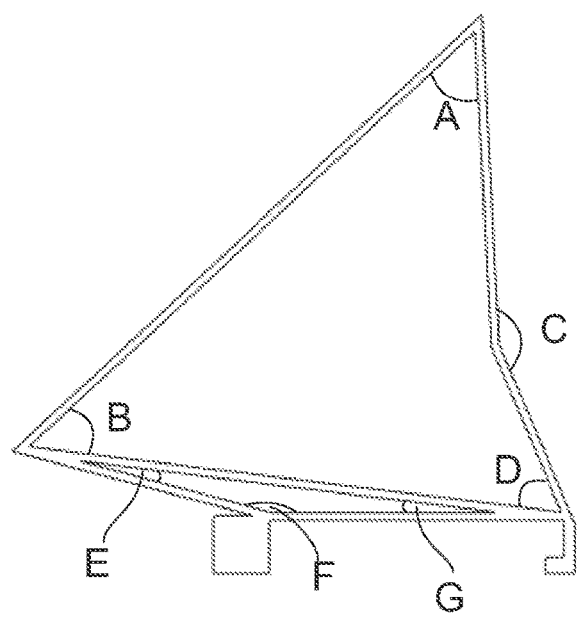
FIG. 9  FIG. 10

ADAPTIVE GRIPPER FINGER, GRIPPER DEVICE AND METHOD OF USING ADAPTIVE GRIPPER DEVICE

CROSS-REFERENCE TO RELATED APPLICATIONS

This application is a 371 U.S. National Phase of International Application No. PCT/FI2020/050564, filed Aug. 31, 2020, which claims priority to Finnish Patent Application No. 20195724, filed Sep. 2, 2019. The entire disclosures of the above applications are incorporated herein by reference.

TECHNICAL FIELD

The present invention relates to gripper devices and a method using a gripper device.

BACKGROUND OF THE ART

In most of today's industries where the automatization is present, required or planed, most automated mechanical systems, manipulators, as well as classical industrial robots (e.g. robotic arms, scara robots, parallel robots, delta robots) need some end-tool in order to grasp or manipulate with different objects and perform different tasks (e.g. pick and place, assembly and much more variety of tasks). End-tool in these systems is also known as end-effector, gripper, grasper, material handling tool. Beside robots there are many other examples in industry in different mechanical systems, automated systems, cartesian systems where the gripper is used as end-tool for gripping and manipulation with objects.

Current solutions of grippers have grown complex and expensive, as everyday manufacturing tasks grow more complex, thus there is a great need for more versatile/adaptive and affordable end-tools. Most of the existing solutions of grippers have limitations and disadvantages. For example:
- they can manipulate with only limited number of objects i.e. they can grasp only limited shape and size of objects, as well as objects with limited variations in stiffness i.e. objects that are mostly considered rigid (larger stiffness),
- for every different application and industry, different grippers exist i.e. one gripper solution for only one specific type, shape, size and stiffness of object. Grippers are usually developed and designed to handle only one type of object or product thus in most cases for every application, type of object (within some range of dimensions and weight) and industry, one gripper solution exists that can handle only this object and in case that other type of object is need to be handled, different solution of a gripper is needed,
- most of the existing grippers cannot grasp soft and easily squeezable objects, like fruits, eggs, vegetables and plants,
- they represent complex solutions with lots of moving parts, rigid links, joints, electrical motors, steel cables, they require complex assembling,
- they have bad scalability, i.e. they cannot be so easily scale down to micro-domain sizes,
- some solutions of grippers require complicated grasping force control algorithms in order to grasp different objects,
- existing solutions of adaptive grippers and universal grippers that can manipulate with broader range of objects are too much expensive, complicate to produce, some require assembly, and have other disadvantages,
- the grippers that can grasp objects of different shapes, sizes, stiffness usually require force control and are very expensive,
- in general, most of the gripping tasks are realized with grippers and methods that require exact force and stroke control of the needed input actuation,
- in general, most of the gripping solutions are expensive and complicate to produce.

In general, most of the existing gripping solutions cannot adapt to different types of object (different shape, size, weight and stiffness of object), thus in most cases different grippers are needed to handle different types of objects.

OBJECTIVE OF THE INVENTION

The objective of the invention is to alleviate the disadvantages mentioned above which is achieved by a new simple low-cost adaptive gripper solution.

SUMMARY

To overcome the above-mentioned disadvantages, a new gripper finger and gripper device is provided for grasping and manipulating objects. The gripper finger is in form of simple monolithic elastically deformable compliant structure that can transfer motion/forces from a power source to the object to be gripped. The monolithic structure does not require assembling and, thus, the device is easy and low-cost to produce. With the specially and optimally designed structure, the same gripper finger can grasp different types of objects (different size, shape, stiffness etc.). Also because of the new structure, it is not required to have force/input motion control to grasp objects. The elastic gripper fingers do not squeeze or break the object but rather adapt to the object shape. Or if the object is stiff, it would rather deform the gripper fingers and not the object. By holding the gripper fingers in deformed state, the gripper device is closed and holds the object. When the input force is no longer applied, the gripper device would open and return to its initial, undeformed state due to releasing of the stored strain energy, similar to a spring.

Further, the force applied to the gripper finger is transferred to the object more efficiently and, thus, the needed power/force is smaller. Moreover, the input motion applied to the gripper finger is transferred more efficiently to the output and, thus, the need actuation input stroke to grip the object, is smaller.

According to a first aspect, the present invention provides a gripper finger for a gripper device having a monolithic elastic structure. The gripper finger comprises an inside arm, having a first folding point forming an angle C, and an outside arm having a second folding point, wherein the inside arm or the outside arm comprises a gripping surface for contacting an object to be gripped. Further, the gripper finger comprises a base portion having a first base end, from which the inside arm is extending, and a second base end, from which the outside arm is extending. The gripper finger also has a tip portion, where the end of the outside arm and the end of the inside arm are connected to each other, and a support arm extending from the first base end to the second folding point. The gripper finger further comprises an angle E between a first part of the outside arm, arranged between the second base end and the second folding point, and the support arm, wherein the angle E is at least 11.5 degrees.

In an embodiment of the device an angle A is arranged at tip portion between outside arm and the inside arm, which angle A is less than 180 degrees.

In an embodiment of the device an angle B between a second part of the outside arm, arranged between the second folding point and the tip portion, and the support arm is less than 180 degrees.

In an embodiment of the device an angle F between the first part of the outside arm and the base portion is less than 180 degrees.

In an embodiment of the device the base portion comprises two protrusions so that the first protrusion is extending from the first base end to the direction that differs from the inside arm direction, and the second protrusion is extending from the second base end to the direction that differs from the outer arm direction.

In an embodiment of the device an angle H between the second protrusion and the base portion is 20-210 degrees.

According to a second aspect, the present invention provides an adaptive gripper device comprising at least two gripper fingers according to any of the previous embodiments, wherein the gripper fingers are monolithic elastic structures arranged to grip an object via elastic deformation, and the gripping surfaces of the gripping fingers are facing each other so that an open space for the object to be gripped is arranged between the gripping surfaces, or the gripping surfaces are facing outwards whereby gripping surfaces may be pushed towards the inner surfaces of the object.

In an embodiment of the device the gripper device comprises a frame structure in which the second base ends are fixed.

In an embodiment of the device the gripper device comprises a frame structure in which the second base ends are fixed by the second protrusions.

In an embodiment of the device the frame structure and the gripper fingers form a monolithic structure.

In an embodiment of the device the gripper device comprises an actuator connected to the first base ends of the gripper fingers for pivoting the tip portions of the gripper fingers towards each other for gripping the object.

In an embodiment of the device the actuator is arranged to pivot the tip portions of the gripper fingers farther from each other.

In an embodiment of the device the actuator is a solenoid actuator.

In an embodiment of the device the first base ends of each gripper finger are connected to each other.

In an embodiment of the device the gripper device is arranged to deform to grip the object to be picked.

Another aspect is to provide a method for gripping an object with an adaptive gripper device comprising steps of actuating a input force to the adaptive gripper device, converting the input force to corresponding gripping force via elastic deformation of the gripper mechanism, and gripping the object via stored deformation energy of the gripper device in combination with the input force.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIGS. 2-25 shows a different variations of the gripper finger,

DETAILED DESCRIPTION

Figures show a different kind of embodiments of the gripper finger and gripper device.

Figure 1:
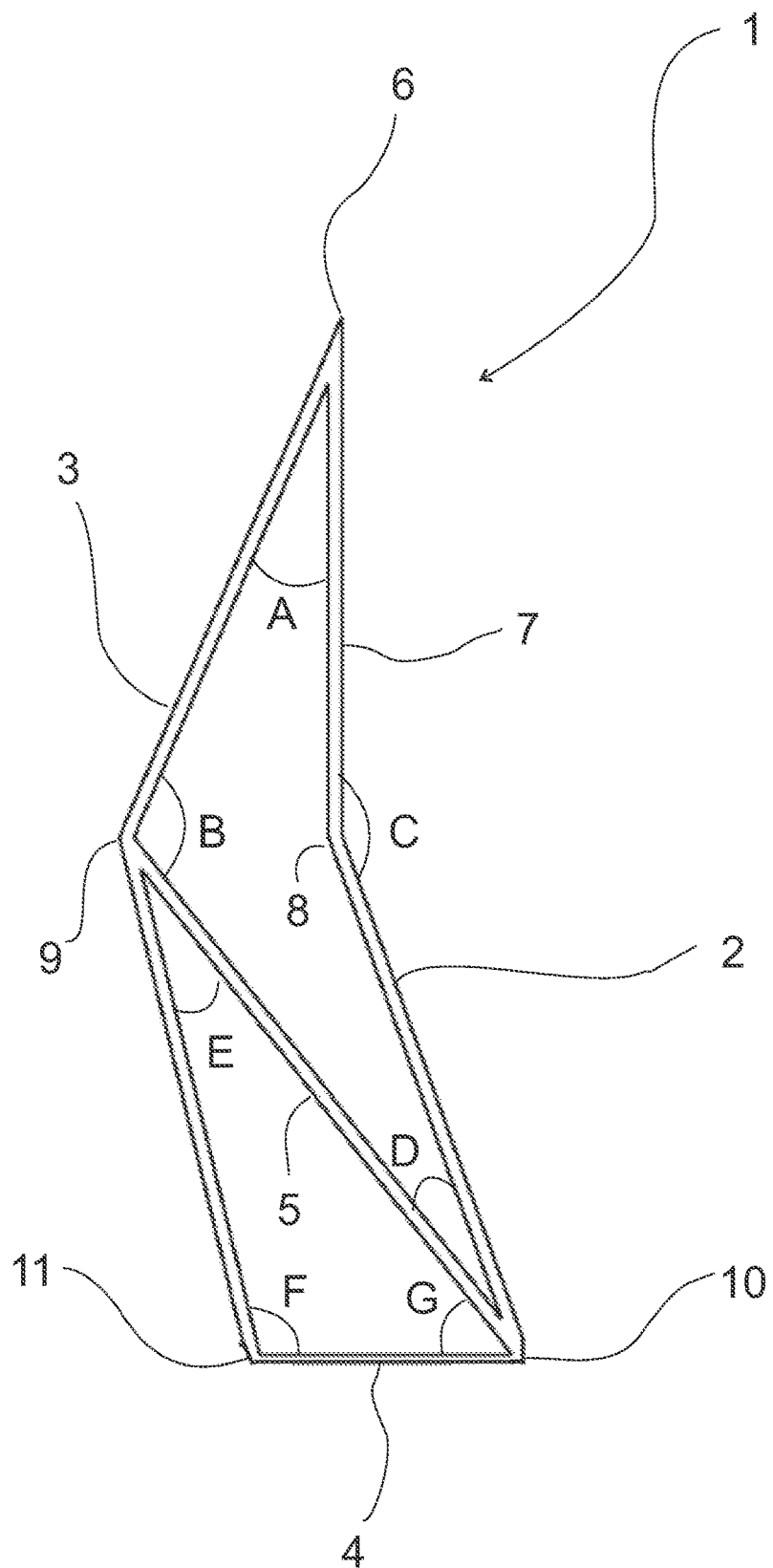
FIG. 1 shows a gripper finger according to first aspect.

FIG. 1 shows a gripper finger 1 having a simple monolithic elastic structure. The gripper finger comprises an inside arm 2 having a gripping surface 7 for contacting an object to be gripped. The inside arm 2 comprises a first folding point 8 which may be provided in any location on the inside arm. In FIG. 1, the first folding point 8 is located approximately at the halfway of the inside arm 2, but later some other alternatives are presented. The first folding point 8 forms angle C on the gripping surface side. The gripper finger comprises also an outside arm 3 having a second folding point 9. Also the second folding point may be provided at any location on the outside arm 3. In FIG. 1, the second folding point is located approximately at the halfway of the outside arm 3. Further, the gripper finger comprises a base portion 4 having a first base end 10 and a second base end 11 so that the inside arm 2 is extending from the first base end 10 and the outside arm 3 is extending from the second base end 11. The other ends of the inside arm 2 and the outside arm 3 are connected to each other forming a tip portion 6 of the gripping device. Also, a support arm 5 is provided and extending from the first base end 10 to the second folding point 9. The gripper finger further comprises an angle E between a first part of the outside arm 3, which is arranged between the second base end 11 and the second folding point 9, and the support arm 5. According to the invention, angle E is at least 11.5 degrees.

The research has shown that by having the angle E at least 11.5 degrees, it leads to increase of transmission force of the gripper, i.e. the performance of the gripper finger increased significantly, while the structure is still firm enough to grasp a wide variety of objects.

According to one embodiment angle E is at least 20 degrees.

According to one embodiment angle E is at least 30 degrees.

The tip portion 6 comprises angle A between outside arm 3 and the inside arm 2. Angle A is preferably less than 180 degrees. Angle B is provided between at the second folding point 9, between the support arm 5 and a second part of the outside arm, arranged between the second folding point 9 and the tip portion 6. Angle D is provided between the support arm 5 and the inside arm at the base portion 4. Angle F is provided between the base portion 4 and the outside arm 3 extending from the base portion. Angle G is provided between the base portion 4 and the support arm 5 extending from the base portion.

According to one embodiment, the monolithic elastic structure of the gripper finger is made of plastic material as it is very suitable, elastic and works well with wide variety of objects. According to some other embodiments the gripper finger may be made of thin metal sheet or rubber like silicone-based rubber material or any other elastic-based materials.

The gripping finger has a simple monolithic, grid-like, structure formed of optimally placed thin and elastic segments. FIGS. 2-25 show different kinds of embodiments of the gripper finger, wherein the above mentioned angles may have different values and the structure may have different dimensions. Each of embodiment presented in FIGS. 2-25 have some specific angle or structure which is described below. The figures show also other angles and dimensions, but they are only presented to complete the structure, i.e. they do not limit the embodiment to such structure.

Figure 2:
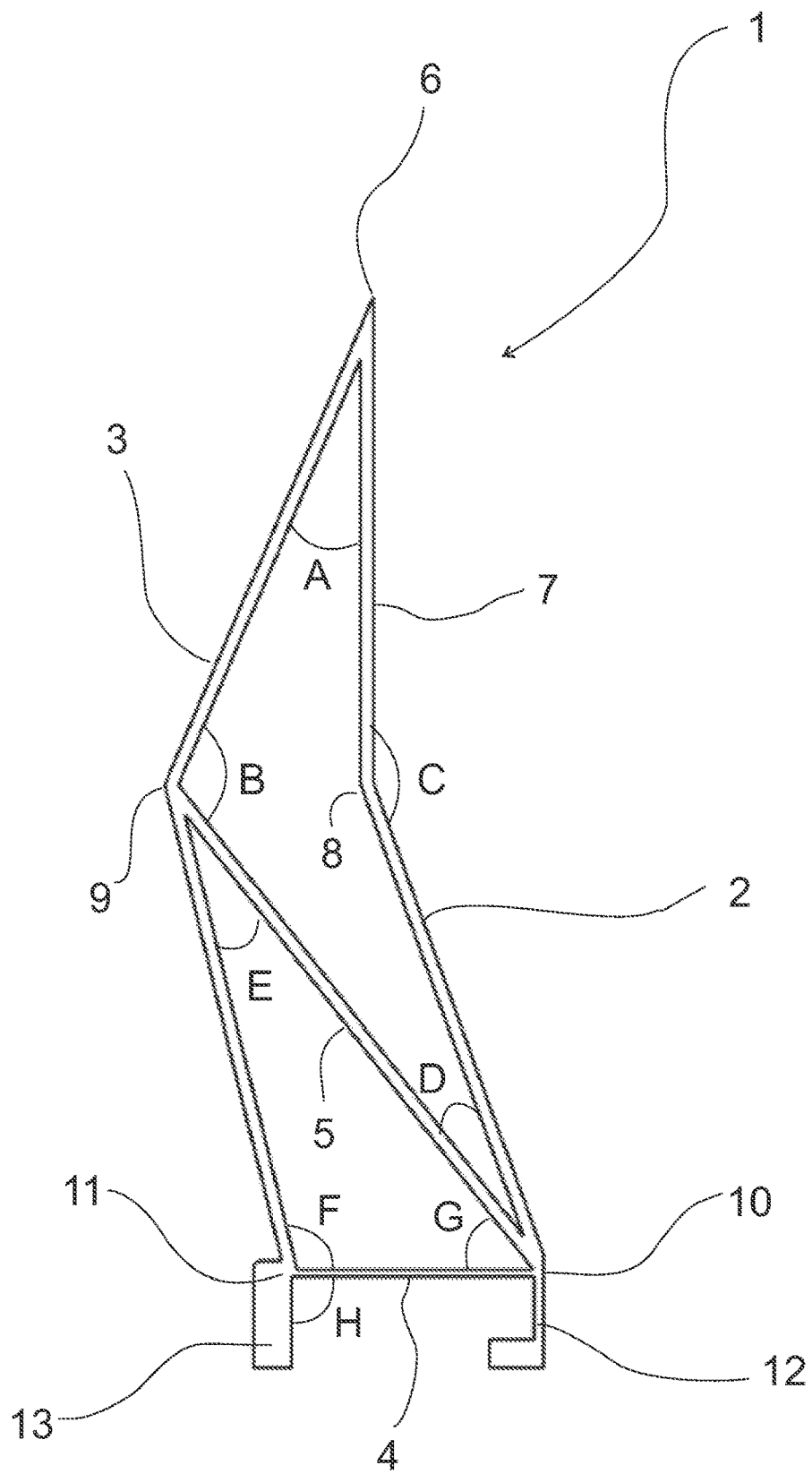

FIG. 2 shows a similar gripper finger as FIG. 1. In FIG. 2, the base portion 4 comprises two protrusions. A first protrusion 12 is extending from the first base end 10 to the direction that differs from the inside arm 2 direction, i.e. the direction of the first protrusion 12 and the inside arm 2, which both extends from the first base end 10, is not the same. A second protrusion 13 is extending from the second base end 11 to the direction that differs from the outer arm 3 direction, i.e. the direction of the second protrusion 13 and the outer arm 3, which both extends form the second base end 11, is not the same.

In one embodiment, the second base end 11 is connected to the second protrusion with a thin segment, i.e. flexure hinge.

According to one embodiment, the second protrusion 13 is part of a frame 14, which is connected to for example to a robotic arm.

According to one embodiment, the first protrusion 12 is used for engaging an actuator to the gripper finger.

Figure 3:
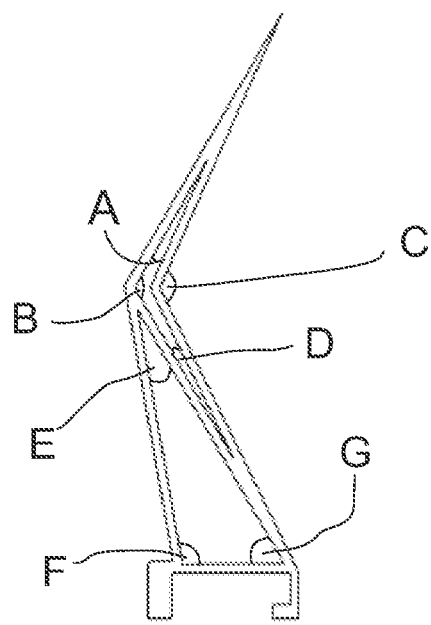

FIG. 3 shows an embodiment wherein angle A and angle D are very acute angles. Preferably angle A is less than 10 degrees.

Figure 4:
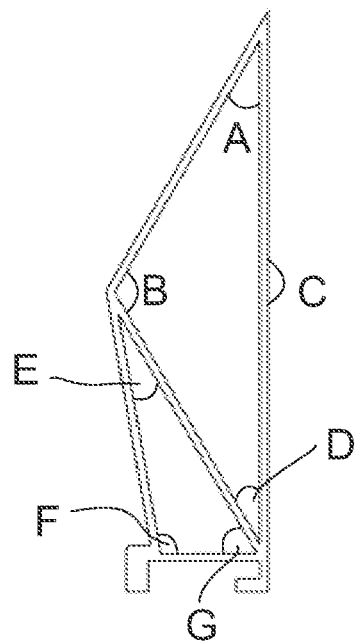

FIG. 4 shows an embodiment wherein angle C is a straight angle, i.e. 180 degrees.

Figure 5:
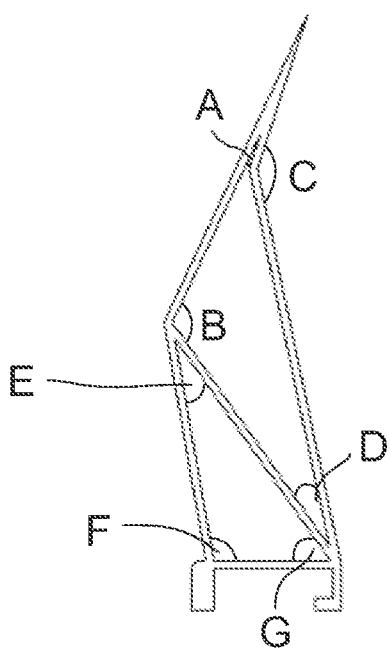

FIG. 5 shows an embodiment wherein angle A is an acute angle and angle C is located at the proximity of the tip portion 6. Preferably angle A is less than 10 degrees.

Figure 6:
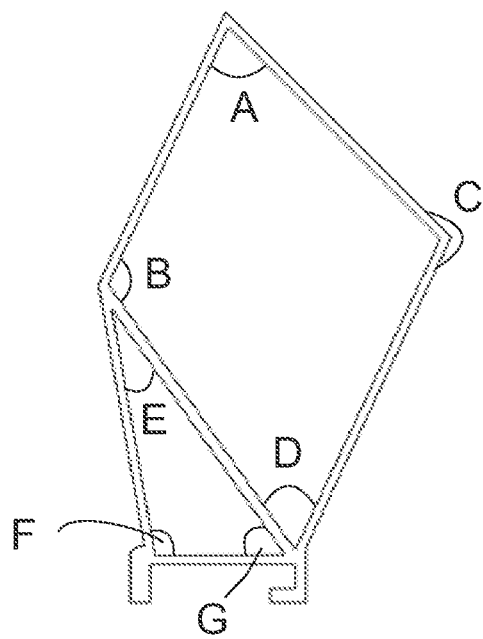

FIG. 6 shows an embodiment wherein the value of angle C is at least 181 degrees. Preferably angle C is from 225 to 270 degrees.

FIG. 7 shows an embodiment wherein angle D is an acute angle and angle C is located at the proximity of the base portion. Preferably angle D is less than 11 degrees.

FIG. 8 shows an embodiment wherein angle G is an acute angle. Preferably angle G is less than 10 degrees.

FIG. 9 shows an embodiment wherein angle G and angle F are acute angles. Preferably angle G and angle F are less than 11 degrees.

FIG. 10 shows an embodiment wherein angle G is an acute angle and angle F is an obtuse angle. Preferably angle G is less than 11 degrees and angle F is from 135 to 179 degrees.

Figure 11:
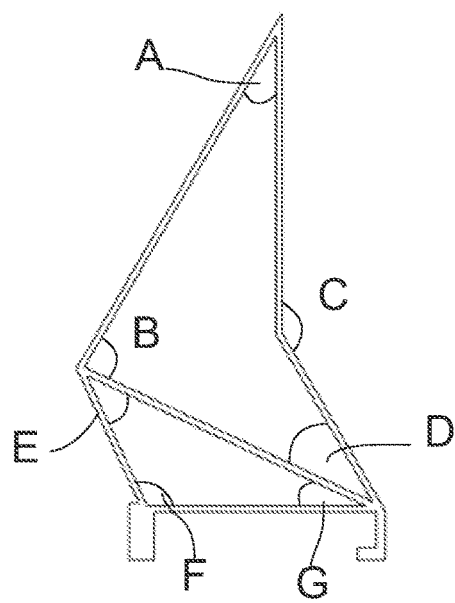

FIG. 11 shows an embodiment wherein angle A is an acute angle and angle F is an obtuse angle. Preferably angle A is from 10 to 45 degrees and angle F is from 91 to 135 degrees. Further, the section of the inner arm, arranged between angle A and angle C, is in perpendicular to base portion.

Figure 12:
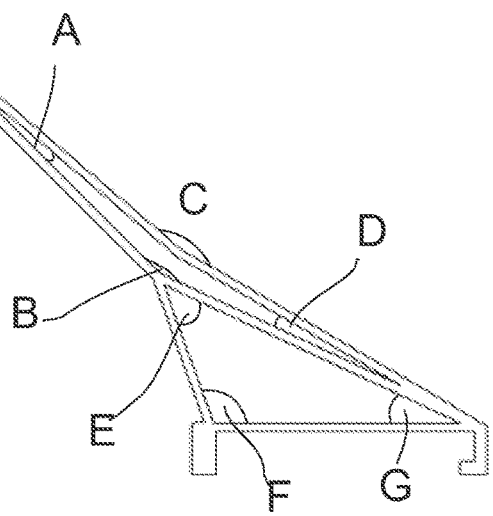

FIG. 12 shows an embodiment wherein angle B is an obtuse angle. Preferably angle B is from 135 to 179 degrees.

Figure 13:
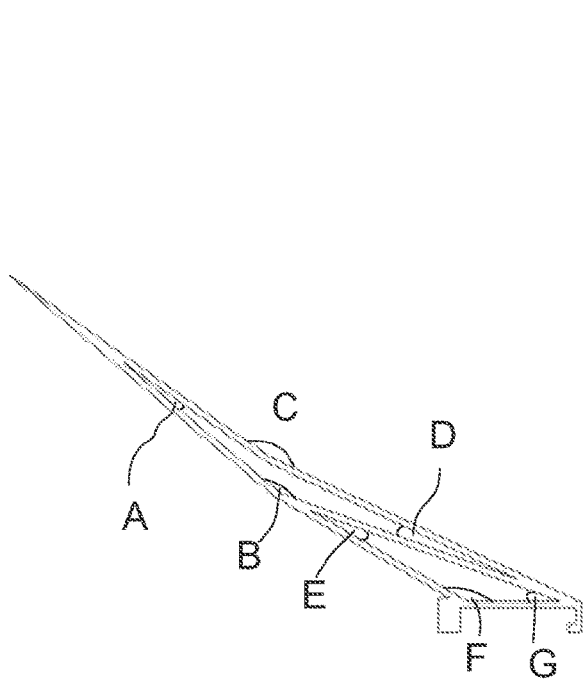

FIG. 13 shows an embodiment wherein angle B and angle F are obtuse angles. Preferably angle B is from 135 to 179 degrees and angle F is from 135 to 179 degrees.

Figure 14:
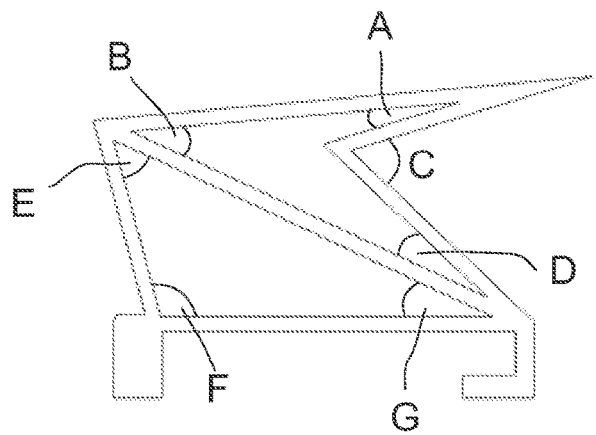

FIG. 14 shows an embodiment wherein angle C is an acute angle. Preferably angle C is from 45 to 89 degrees.

Figure 15:
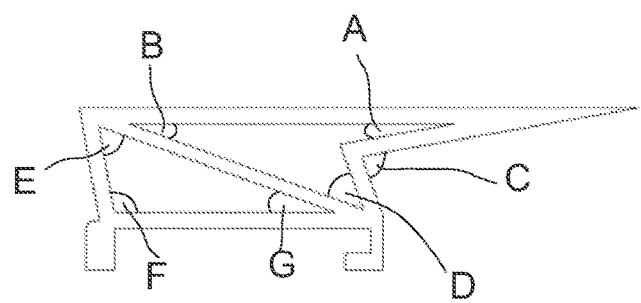

FIG. 15 shows an embodiment wherein angle C is an acute angle and the base portion and the portion of the outer arm, located between the second folding point and the tip portion, are arranged in parallel direction. Preferably angle C is from 70 to 89 degrees.

Figure 16:
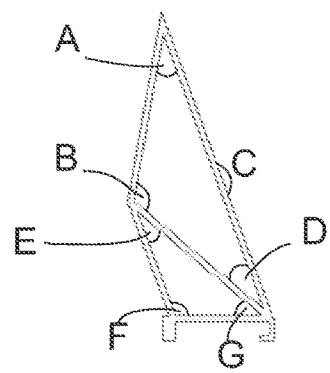

FIG. 16 shows an embodiment wherein angle C is a straight angle, i.e. 180 degrees and angle G and angle D together form an acute angle.

Figure 17:
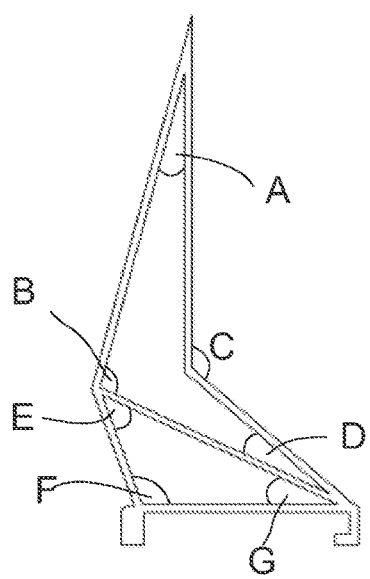

FIG. 17 shows an embodiment wherein angle G and angle D together form an acute angle, and the portion of the inner arm, located between the first folding point and the tip portion, is perpendicular to the base portion.

Figure 18:
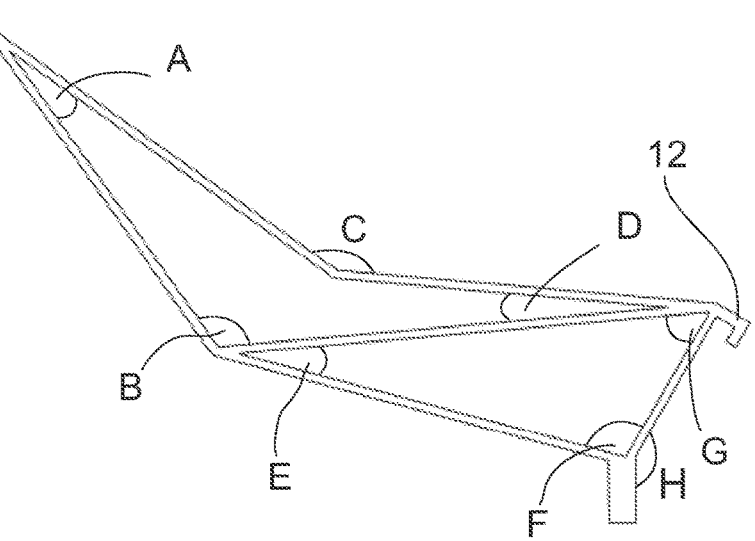

FIG. 18 shows an embodiment wherein angle H is an obtuse angle. Preferably angle H is from 135 to 179 degrees. Also, the first protrusion 12 comprises an end section which is parallel to the base portion.

Figure 19:
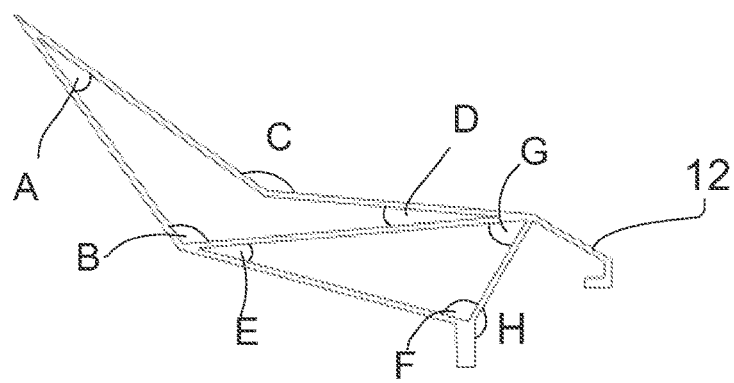

FIG. 19 shows an embodiment wherein angle H is an obtuse angle. Preferably angle H is from 135 to 179 degrees.

Figure 20:
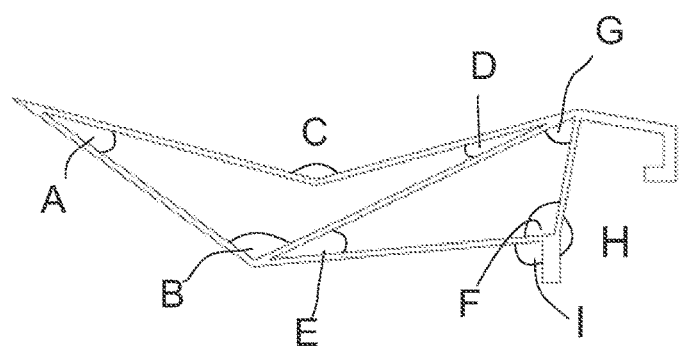

FIG. 20 shows an embodiment wherein angle H is an obtuse angle. Preferably angle H is from 135 to 179 degrees. The gripper finger according to this embodiment comprises an acute angle I, which is preferably from 75 to 89 degrees.

Figure 21:
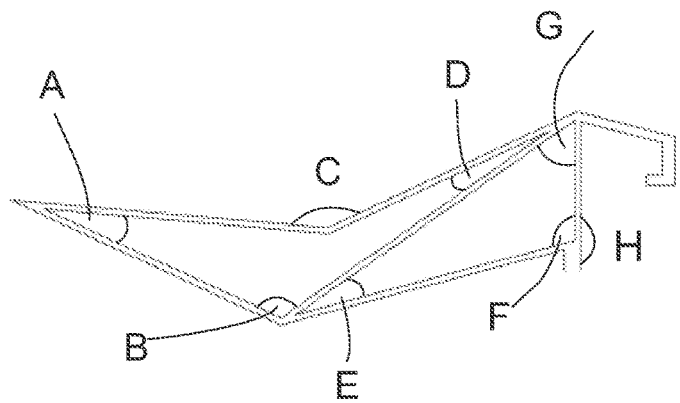

FIG. 21 shows an embodiment wherein angle H is a straight angle, i.e. angle H is 180 degrees.

Figure 22:
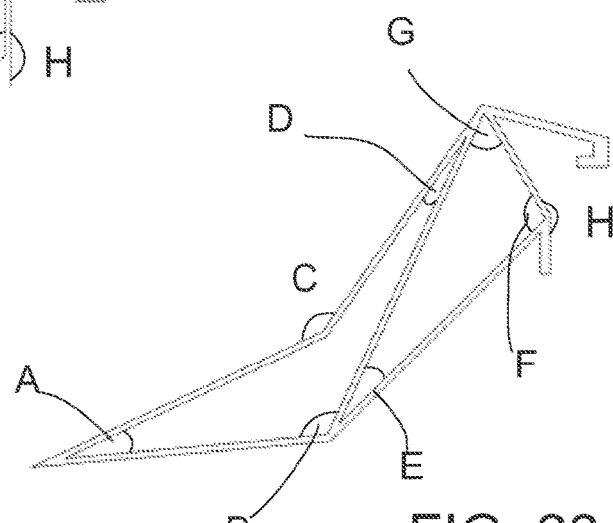

FIG. 22 shows an embodiment wherein angle H is a reflex angle. Preferably angle H is from 181 to 225 degrees.

Figure 23:
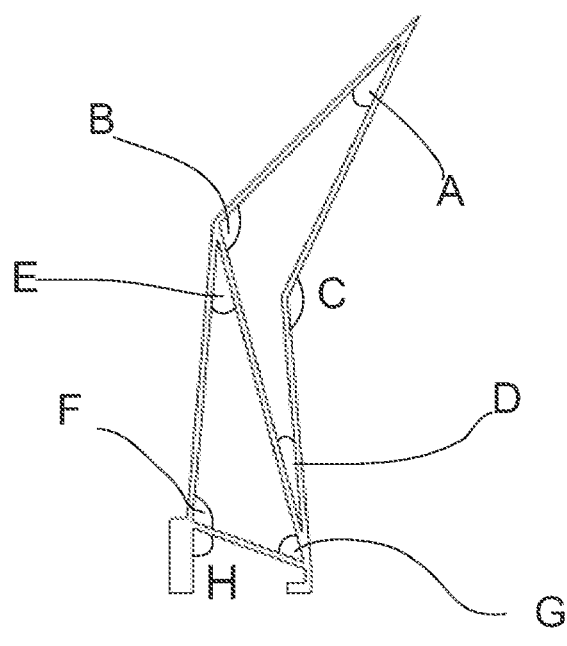

FIG. 23 shows an embodiment wherein angle H is an acute angle. Preferably angle H is from 70 to 89 degrees.

Figure 24:
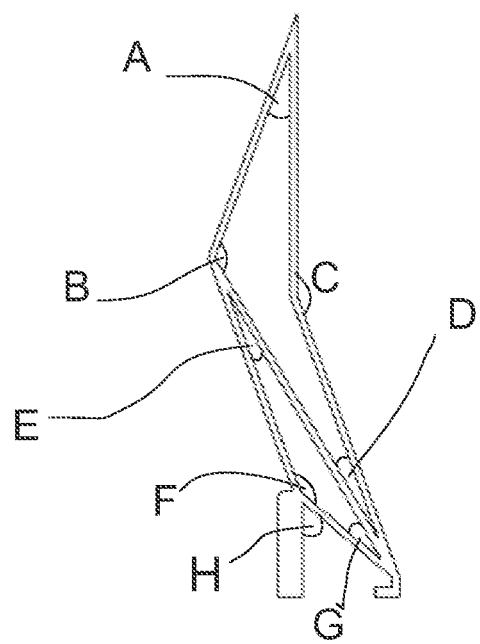

FIG. 24 shows an embodiment wherein angle H is an acute angle and angle F is an obtuse angle. Preferably angle H is from 45 to 70 degrees and angle F is from 135 to 179 degrees.

Figure 25:
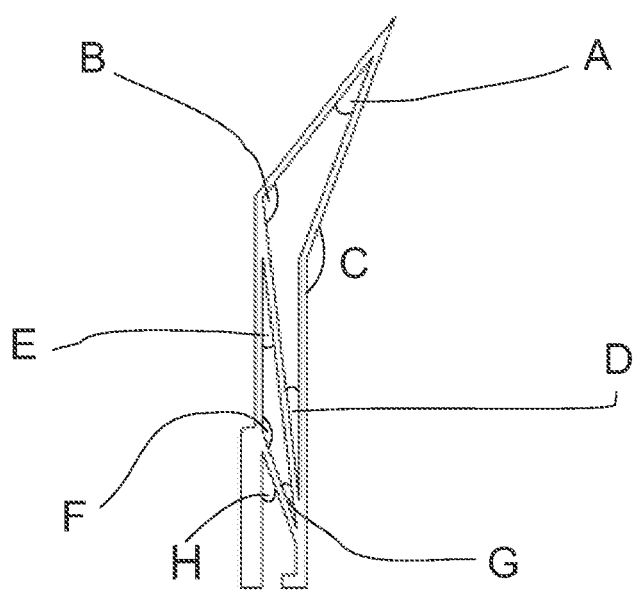

FIG. 25 shows an embodiment wherein angle H is an acute angle, and angles G and D together forms an angle which is corresponding the value of angle H. Preferably angle H is from 10 to 45 degrees.

According to one embodiment of the device, the outside arm 3 comprises a gripping surface for contacting an object to be gripped. Such gripper finger may be used for gripping an object from the inside, i.e. placing the gripping fingers inside an object, such as a cup, spread the fingers towards the inner surfaces of the cup wall and lift.

In one embodiment, the gripper finger comprises at least one curved section, e.g. the inside arm 2, outside arm 3, base portion 4 and/or support arm 5 has a curved section instead of linear section.

FIGS. 26-29 show a different kind of embodiments of a gripper device 15. Each of the gripper device embodiments comprise at least two gripper fingers 1 for gripping or grasping an object and object manipulation. FIGS. 26-29 illustrate embodiments of gripper devices and it is to be noted that the gripper fingers 1 of the gripper device may be any kind of gripper fingers 1 described above.

Figure 26:
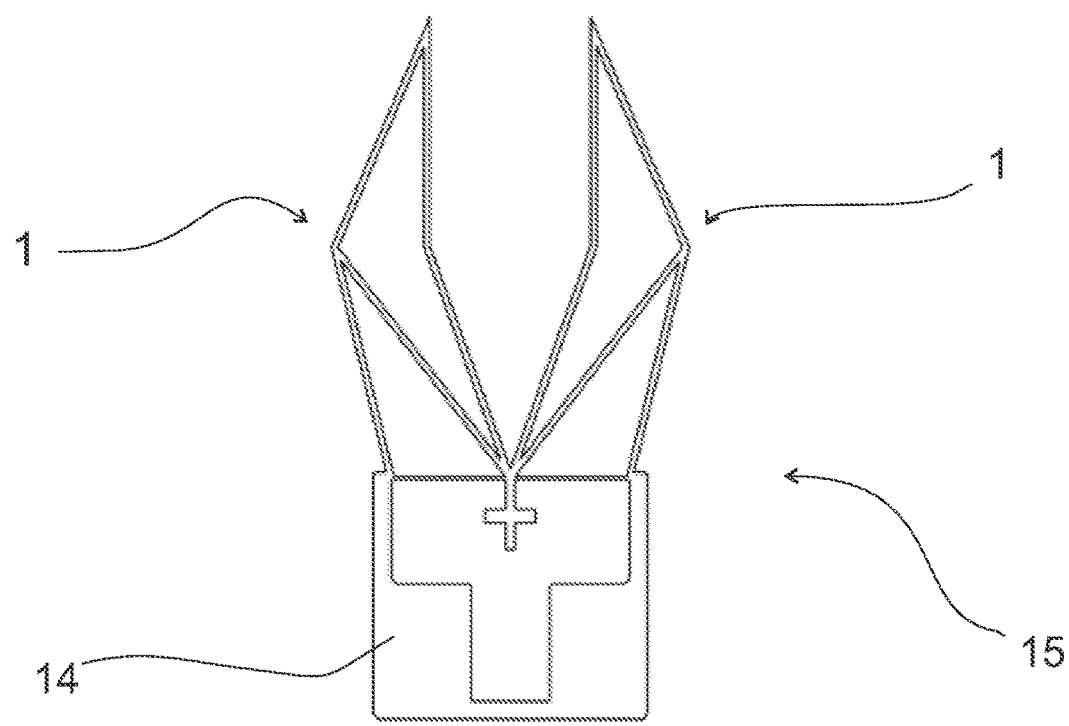
FIG. 26 shows a gripper device comprising two gripper fingers.
Figure 27:
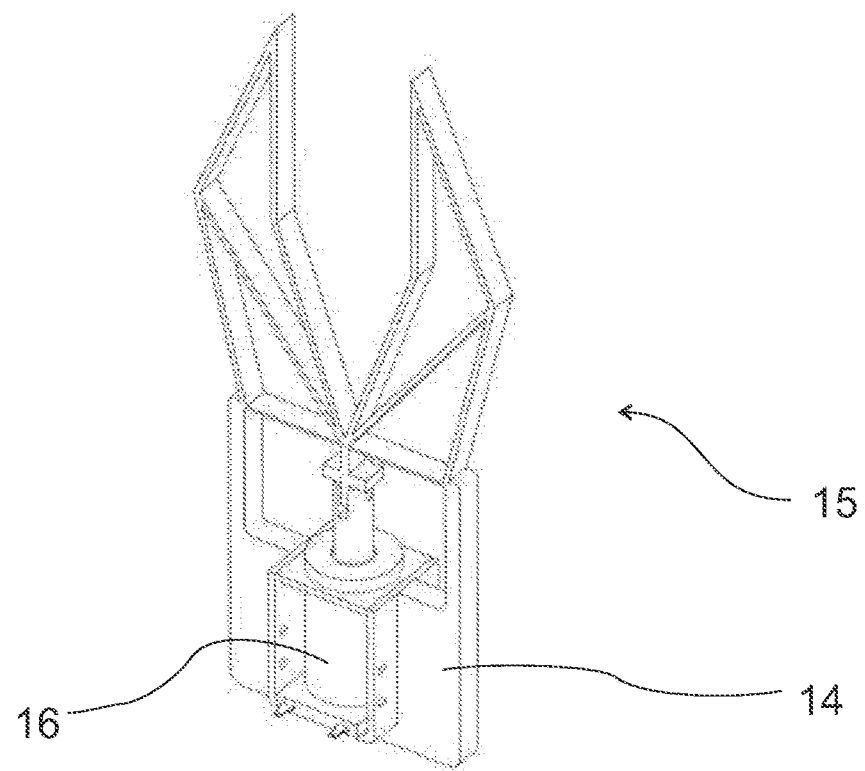
FIG. 27 shows a gripper device comprising two gripper fingers and an actuator.
Figure 28:
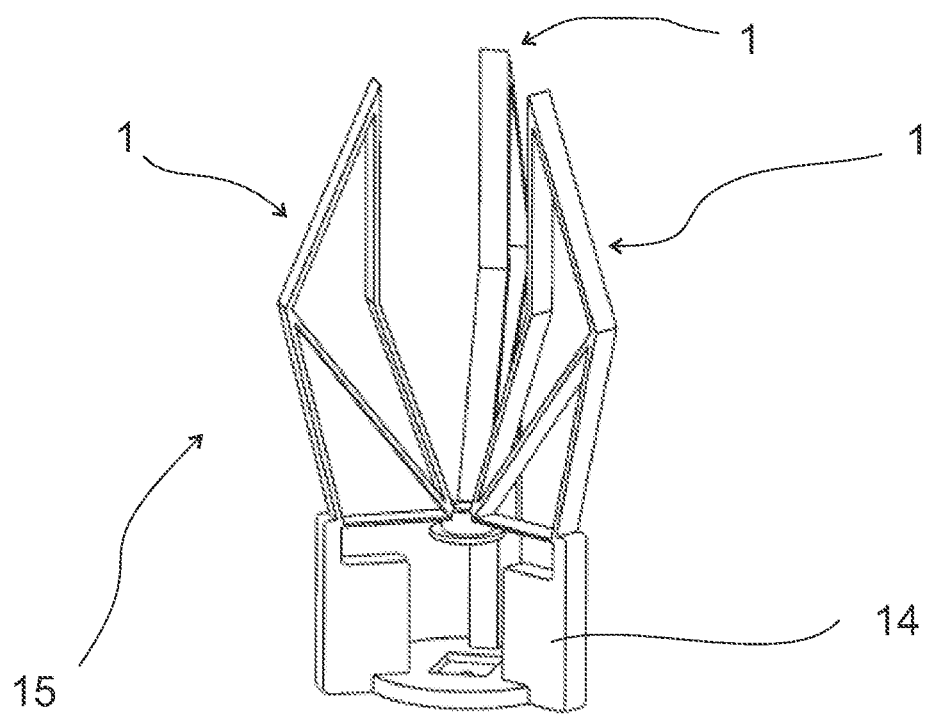
FIG. 28 shows a gripper device comprising three gripper fingers.
Figure 29:
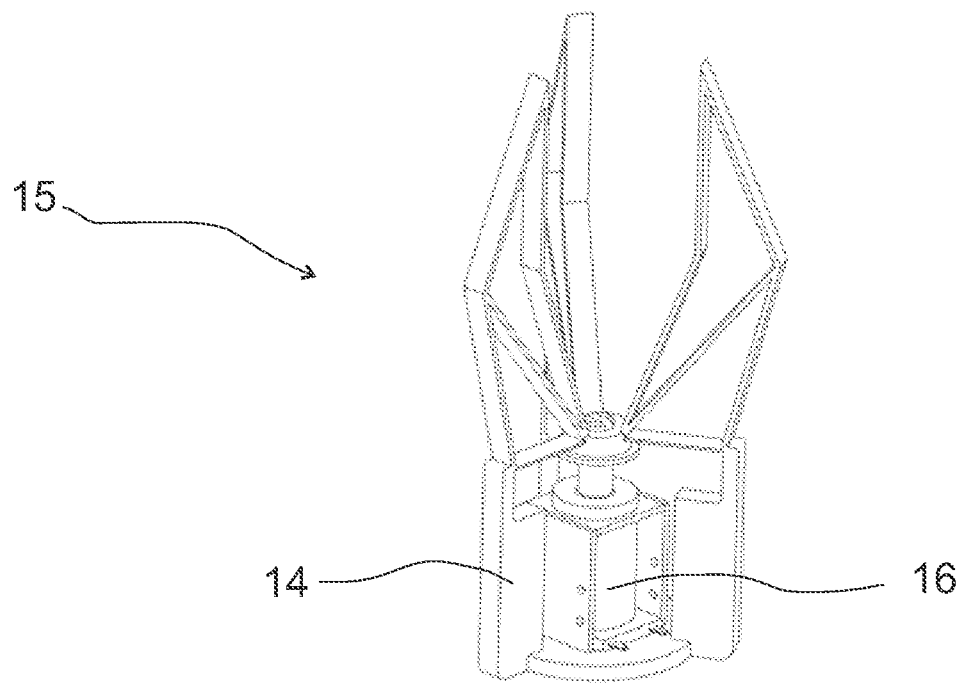
FIG. 29 shows a gripper device comprising three gripper fingers and an actuator.

FIGS. 26 and 27 show a gripper device 15 having two gripper fingers 1 and a frame structure 14, and the FIGS. 28 and 29 show a gripper device 15 having three gripper fingers 1 and a frame structure 14.

Although the figures show gripper devices having multiple gripper fingers arranged symmetrically, the gripper fingers of the gripper device may be arranged asymmetrically.

The individual gripper fingers 1 of the gripper device are monolithic part connected to the frame structure of the gripper device. The frame structure 14 of the gripper device may be mounted to a holding part of a manipulator or an industrial robot (a robotic arm or such). The frame structure 14 comprises an empty space, seen especially in FIGS. 26 and 28, for an actuator, which is seen in FIGS. 27 and 29. The actuator is connected to the first protrusions 12 of the gripper fingers 1 and is arranged to cause an input force at the input ports of the gripper device (first protrusions 12 of each gripper finger 1). The input force may be pulling force, i.e. the actuator pulls the first protrusions 12 towards the frame structure 14 causing the gripper device to close, or the input force may be pushing force, i.e. the actuator pushes the first protrusion outwards of the frame structure 14 causing the gripper device to open.

According to one embodiment of the device, the gripper fingers 1 and the frame structure 14 form a monolithic structure, i.e. the second base ends 11 of the gripper fingers may be fixed to the frame structure 14.

In one embodiment, a rotation joint is arranged between the second base ends 11 and the frame structure so that the gripper finger is rotated around the rotation joint when an object is gripped.

The input force (and motion) is transmitted by the compliant structure of the gripper device to the output port (tip portions 6 of the gripper fingers 1), but also to the gripping surface of the gripper device. In other words, the closing of the gripper fingers is realized due to elastic deformation of the gripper structure. One part of the input force is spent on the deformation of the elastic structure, but other part of the input force is transmitted to the output ports (and gripping surface) and gripper can realize output holding forces. If any object is placed between gripper fingers, the gripper device would realize grasping of the object with certain holding force (depending on the intensity of the input force). But because the elasticity of the gripper device, the gripper fingers will in some cases conform to the shape of the object. Or, if the object is soft, it would not break the object (again due to compliance of the gripper fingers) but still would be able to effectively realize grasping. Thus, the gripper device realizes grasping of wide variety of objects with different shapes and especially soft and easily squeezably objects (like fruits or vegetables) or fragile objects (like light bulbs or eggs). Further, due to elastic structure of the gripper device, there is no need for controlling the grasping force, i.e. just input force is applied and there is no need to control the force that the gripper fingers exert on an object. The gripper fingers rather deform or adapt to the object shape. By holding the gripper device in the deformed state, the gripper device will be closed, and the object is held. When the input force is released, i.e. the input force is no longer applied at the input port, the gripper device will open and return to its initial, undeformed state (position where the gripper fingers are open) of its own volition. This is due to the stored deformation energy, i.e. energy that is stored within the deformed segments of the gripper device so when the input force is released, the energy is released and the gripper device returns to its initial undeformed state. In a way, the gripper device behaves like a spring and it has built-in restoring force and, thus, no return force is needed.

The gripper device is made of elastic material. According to one embodiment the material is plastic material due to its favorable characteristics. According to some other embodiments, the material may be for example thin sheet metal, rubber or silicone-based rubber material or some other elastic material.

As noted above, the gripper device may comprise an actuator 16 as an input drive for the gripper mechanism (see FIGS. 27 and 29). The actuator 16 is integrated to the frame structure 14 so that the actuator does not move, in relation to the gripper devise, in use. In one embodiment, the actuator is mounted to the frame structure 14 by screws and/or bolts. Further, the actuator 16 is mounted to the gripper fingers at the first protrusion 12. It may be mounted by screws, glue or by an axle which is part of the actuator and is arranged through a hole in the first protrusion 12.

According to one embodiment the actuator is a solenoid actuator. Due to its characteristics, the solenoid actuator works very fast. The gripper device with integrated solenoid actuator 16 works so that an input voltage is applied to the solenoid actuator and then the electromagnets turns on and attracts the first protrusion 12 by pulling it down causing the gripper device to close. As long as the solenoid actuator is powered, the gripper device is closed, and possible object is held with certain holding force. When the input voltage for the solenoid actuator is turned off, the gripper device will return to its initial undeformed state, i.e. open position, as described earlier.

However, according to some embodiments, the actuator may be other kind of actuating device, which causes input drive for the gripper mechanism, such as electro-motor, pneumatic or hydraulic cylinders, or smart material based actuators, or other type of linear motors or rotary motors with additional elements to transform the rotation to needed linear actuating motion.

In one embodiment, the actuator is mounted to the first base end 11 of each gripper finger. However, in some embodiments the gripper fingers comprise a first protrusion 11 in which the actuator is mounted. The first protrusion 11 may be shared by the gripper fingers as seen in FIGS. 28 and 29, wherein all three gripper fingers share a same first protrusion, which is connected to the first base ends of each of the gripper fingers.

The gripper device may comprise integrated sensors to give the gripper device some advanced features. According to one embodiment, the gripper fingers comprise conductive foam-based sensors, which work so that when the sensor/foam is deformed (e.g. pressed) there is a change of electrical resistance of the foam, which is measurable and possible to utilize to detect pressure. Further the conductive foam sensors may work so that they can only detect pressure i.e. if the sensor is pressed or not. In the gripper device, the foam sensors are used to detect when the gripper touches the ground and also the foam is used not as a sensor but to increase the friction between gripper fingers and the objects when grasping.

According to one embodiment, the gripper device comprises contact sensors (for example membrane potentiometer, a resistive touch sensor, a capacitive touch sensor, or some other form of smart material based sensor, which can detect pressure when touched/pressed, but they can also detect location where the sensor is pressed (along the sensors surface they give different output voltage values, or some other form of signal change, depending on where the sensor is pressed), and they are much more stable than the conductive foam sensors. In gripper device, the contact sensors may be used also to detect when the object is grasped but also it gives ability to a gripper to recognize the shape of objects that is grasped.

According to one embodiment, the gripper device comprises bend sensors (for example elastic deformation sensor, an angle displacement sensor, or a flex sensor or some other form of smart material-based sensor, which can detect bending deformation i.e. if the sensor is bend in one or other direction it can detect this, and depending on a bending angle it gives different output values of electrical resistance, or some other form of signal change, so it can also measure the bending angle. In gripper device, the bend sensors are used also to detect when the object is grasped but also it gives ability to a gripper to recognize the shape of objects that is grasped, more about this in the next section.

According to one embodiment, the gripper device comprises several above-mentioned sensors. The sensors are integrated in the gripper device having two gripper fingers in the following way: first contact sensor is attached across the one half of the gripping surface of first finger and second contact sensor is attached across the half of the gripping surface of the second finger. Then first bend sensor is attached across the remaining free space at the gripping surface of the first finger, and second bend sensor is glued across the remaining free space of the gripping surface at the second finger. After this the both sensors and the whole grasping surface of both fingers are covered with the conductive foam. Similar thing is with the gripper device having three gripper fingers, where on the first finger one contact sensor is attached, on second finger one bend sensor is attached, and on the third finger both contact sensor and bend sensor are attached, so one sensor covers only half of the gripper finger gripping surface, so in that way both sensors are used to cover the whole gripping surface.

In more detail, the sensors are used so that gripper device can detect when it touches the ground (with the tip portions of the gripper fingers) on which the object is laying, then to realize grasping of that object, lift the object and move it to a needed location, then again when it touches the ground, to release and place the object on the ground/desired location. The gripper device can realize pick-and-place tasks without the need of external signal from the robot controller to tell the gripper device when to realize grasping and releasing of the object, but rather the foam sensors integrated in the tips of gripper fingers tell this. In this way the gripper and robot system are free from need for external sensors, control and vision-based systems as all is integrated in the gripper.

Further explaining, the principle of pick-and-place with the new gripper device works like this: when the gripper device with the tip portion of its fingers touches the ground (by going vertically down towards the object) the conductive foam sensors deform and detects this (detects pressure), then this signal from the sensors is send to a gripper controller that turn on the actuator (for example solenoid actuator), thus gripper realize grasping. Then when the object is picked and moved to a desired location, the gripper device moves towards the ground, then again with the foam sensors on the tip portions of the fingers, detects that it touched the ground and this signal is sent to a gripper controller that turns off the actuator (for example solenoid actuator), thus the gripper realize releasing of the objects.

According to one embodiment, the gripper controller is micro-controller that controls the actuator (for example solenoid actuator) and, based on signals from the foam sensors, contact and/or bend sensor and the control algorithm, it can realize recognition of object shape that is gripped.

During an operation, the adaptive gripper device is brought in proximity of an object and a input force is actuated. The input force is converted via elastic deformation of the gripper mechanism corresponding gripping force, causing the gripper fingers to elastically deform around the object. After the adaptive gripper device has deformed around the object, it may be lifted or moved. The input force may be actuated by an actuator or it may be actuated manually for example by hand. The actuator may be an electromagnetic actuator, such as a solenoid actuator. As the object is gripped via stored deformation energy of the gripper device in combination with input force provided by the actuator, and as gripper device elastically deforms, there is no need for gripping force control. Thus, the electromagnetic actuator may have only simple on/off control, without the need for force or stroke control.

The input force may be provided by an actuator, as explained earlier, or by hand.

Although the invention has been described in conjunction with a certain type of device, it should be understood that the invention is not limited to any certain type of device. While the present inventions have been described in connection with a number of exemplary embodiments, and implementations, the present inventions are not so limited, but rather cover various modifications, and equivalent arrangements, which fall within the purview of prospective claims.

The invention claimed is:

1. A gripper finger for a gripper device having a monolithic elastic structure comprising
   an inside arm having a first folding point forming an angle C,
   an outside arm having a second folding point,
   wherein the inside arm or the outside arm comprises a gripping surface for contacting an object to be gripped,
   a base portion having a first base end, from which the inside arm is extending, and a second base end, from which the outside arm is extending,
   a tip portion where the end of the outside arm and the end of the inside arm are connected to each other,
   a support arm extending from the first base end to the second folding point,
   wherein the gripper finger further comprises an angle E between a first part of the outside arm, arranged between the second base end and the second folding point, and the support arm, wherein the angle E is at least 11.5 degrees.

2. A gripper finger according to claim 1,
   wherein an angle A is arranged at tip portion between outside arm and the inside arm, which angle A is less than 180 degrees.

3. A gripper finger according to claim 1,
   wherein an angle B between a second part of the outside arm, arranged between the second folding point and the tip portion, and the support arm is less than 180 degrees.

4. A gripper finger according to claim 1,
   wherein an angle F between the first part of the outside arm and the base portion is less than 180 degrees.

5. A gripper finger according to claim 1,
   wherein the base portion comprises two protrusions so that the first protrusion is extending from the first base end to the direction that differs from the inside arm direction, and the second protrusion is extending from the second base end to the direction that differs from the outer arm direction.

6. A gripper finger according to claim 5,
   wherein an angle H between the second protrusion and the base portion is 20-210 degrees.

7. An adaptive gripper device according to claim 1 further comprising:
   at least two grip fingers,
   wherein the gripper fingers are monolithic elastic structures arranged to grip an object via elastic deformation, and
   the gripping surfaces of the gripping fingers are facing each other so that an open space for the object to be gripped is arranged between the gripping surfaces, or the gripping surfaces are facing outwards whereby gripping surfaces may be pushed towards the inner surfaces of the object.

8. An adaptive gripper device according to claim 7, wherein the gripper device comprises a frame structure in which the second base ends are fixed.

9. An adaptive gripper device according to claim 7, wherein the gripper device comprises a frame structure in which the second base ends are fixed by the second protrusions.

10. An adaptive gripper device according to claim 8, wherein the frame structure and the gripper fingers form a monolithic structure.

11. An adaptive gripper device according to claim 7, wherein the gripper device comprises an actuator connected to the first base ends of the gripper fingers for pivoting the tip portions of the gripper fingers towards each other for gripping the object.

12. An adaptive gripper device according to claim 11, wherein the actuator is arranged to pivot the tip portions of the gripper fingers farther from each other.

13. An adaptive gripper device according to claim 11, wherein the actuator is a solenoid actuator.

14. An adaptive gripper device according to claim 7, wherein the first base ends of each gripper finger are connected to each other.

15. A method of gripping an object with an adaptive gripper device according to claims 1 comprising steps of
actuating an input force to the adaptive gripper device independent from the object,
converting the input force via elastic deformation of the gripper mechanism to corresponding gripping force, and
gripping the object via stored deformation energy of the gripper device in combination with the input force.

\* \* \* \* \*